June 3, 1930.  L. BLACKMORE  1,761,966

TRANSMISSION

Filed Jan. 27, 1928

Inventor
Lloyd Blackmore

By Blackmore, Spencer & Hiiti
Attorneys

Patented June 3, 1930

1,761,966

UNITED STATES PATENT OFFICE

LLOYD BLACKMORE, OF DETROIT, MICHIGAN, ASSIGNOR TO GENERAL MOTORS RESEARCH CORPORATION, OF DETROIT, MICHIGAN, A CORPORATION OF DELAWARE

TRANSMISSION

Application filed January 27, 1928. Serial No. 250,008.

This invention relates to a transmission and, more particularly, a synchronizing device for use with a sliding gear type of transmission.

In transmissions such as are used in an automotive vehicle, it is necessary to disengage a gear from its driver and engage it with another rotating at a speed different from that of the first. This operation usually results in more or less clashing of gears.

It is an object of the invention to provide synchronizing means in transmission mechanism so that as a driven member is disengaged from one driving member and moved toward engagement with a second, it will assume approximately the same speed as the second before positive engagement. More specifically it is an object of the invention to provide a transmission mechanism in which the driven and driving members are frictionally clutched together, to assure a further and positive engagement when desired and without noise, or "gear clashing".

Other objects and advantages of the invention will appear in the course of the following description, taken in connection with the accompanying drawings and appended claims.

Figure 1:
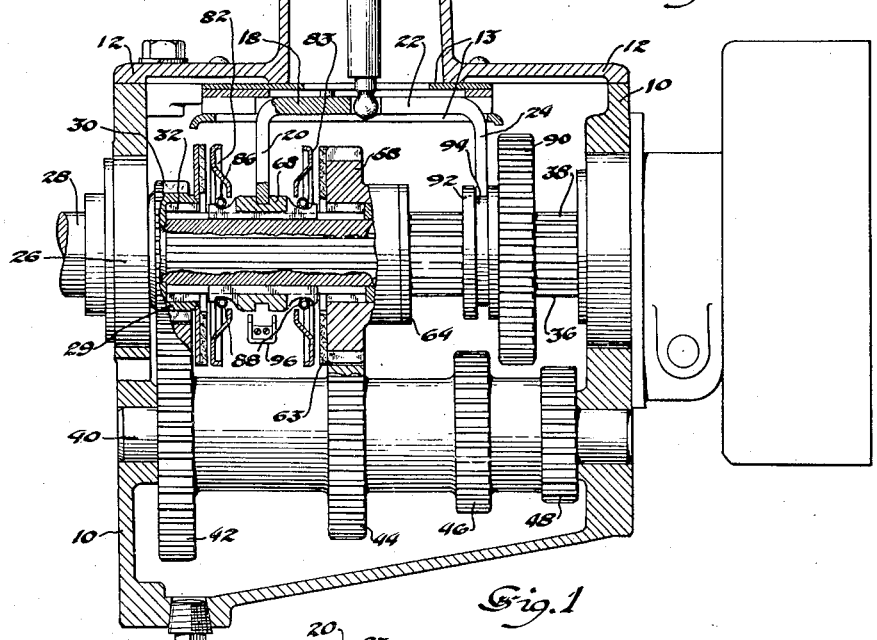
Figure 1 is a longitudinal sectional view, with parts broken away, of a transmission embodying my invention.

Referring to the drawing, I have illustrated in Figure 1 a transmission casing 10 provided with a removable cover 12, having an upward extending central portion 14 in which is universally journalled a gear shift lever 16. Supported on the under side of the cover 12 between the guide plates 13 and longitudinally slidable relatively thereto is a shifter 18 provided with a downward extending fork 20 and a shifter 22 provided with a downward extending fork 24, the two shifters being operable by means of the lever 16 in the usual way. Since the structure thus far referred to is conventional, it is unnecessary to describe it in any greater detail.

Extending into the forward end of the casing 10 and journalled in a bearing 26 therein is a main drive shaft 28 driven directly from the engine through any suitable declutching mechanism, as customary. The end of the shaft 28 within the casing is enlarged to provide a gear 29 having teeth 30, and further is recessed to provide internal teeth or splines 32 and a pilot bearing 34. Fixed to the rear face of gear 29 is a metallic plate 31 on the rear face of which is fixed by means of rivets a ring 33 of friction material. Journalled in the recessed end of the shaft 28 is the reduced front end 9 of a shaft 36 which is splined on its outer surface, as indicated at 38.

Journalled in the lower part of the casing 10 is a counter-shaft 40, on which are mounted four gears 42, 44, 46 and 48, decreasing in size progressively from front to rear. The four gears 42, 44, 46 and 48 are spaced from each other and are either splined to the shaft 40, or formed as a unit, as customary in transmission counter-shafts, and the gear 42 is positively in mesh with the gear 29.

Fixed on the central portion of shaft 36, by means of a stud 54, is a splined collar 56, and rotatable on this collar is a gear 58 provided with internal splines 60 and external teeth 62. The splines 60 abut against the front face of collar 56 and prevent rearward movement of gear 58, while forward movement of the gear is prevented by a retaining ring 64 fixed to its rear side by means of screws 66. On the front face of the gear 58 is fixed a ring 63 of friction material, similar to the ring 33. The gear 58 is constantly in mesh with the counter-shaft gear 44.

Figure 4:
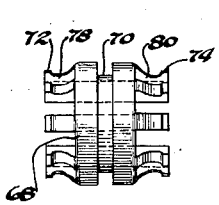
Figure 4 is a side view of the slidable clutch member.

Splined on the shaft 36, between the gears 58 and 29 and slidable thereon is a positive clutch member 68, illustrated in Figure 4. The clutch member 68 comprises a central annular portion or collar formed with a central circumferentially extending groove 70 for receiving the bifurcated end 20 of the shifter 18. On the ends the clutch member 68 has the axially extending keys 72 and 74 formed by slotting the clutch ends between the splines.

Figure 3:
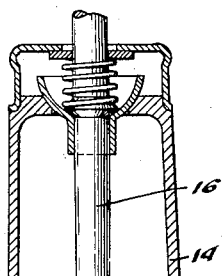
Figure 3 is an end view of one of the friction plates.
Figure 3:
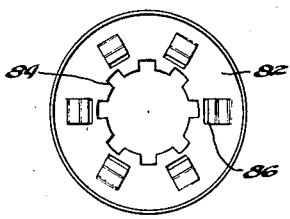

On the outer surface of the keys 72 is an annular groove 78 and on the keys 74 is a similar annular groove 80. The circumference of the clutch member 68 increases gradually from the inner ends of the keys toward the central groove 70. Mounted on the front end of the clutch member 68 is a friction plate 82, while similarly mounted on the rear end is a friction plate 83. The two plates are exactly the same in structure but are mounted facing opposite directions. Each plate, as illustrated in Figure 3, is formed with a central opening 84 splined for fitting between the keys 72 and 74 and sliding axially along the splines of the shaft 36. On the rear or adjacent sides each plate is formed with fingers 86 extending away from the face of the plate and radially inward. A ring 88 formed of a helically wound spring wire is arranged between the fingers 86 and the main portion of plate 82, and normally rests in the groove 78, while a similar ring is arranged between the fingers 86 and the main portion of plate 83 and rests in groove 80. The rings 88 are under a tension tending to cause them to contract.

Splined on the shaft 36 in rear of the gear 58 is a gear 90 formed with a hub 92 having a groove 94 adapted to receive the bifurcated end 24 of shifter 22. In its farthest forward position the gear 90 is in mesh with the gear 46, for driving the vehicle in low gear, while in its farthest rear position it is in mesh with an idle gear (not shown) which is constantly in mesh with the gear 48, for driving the vehicle in reverse, all as customary with a sliding gear type of transmission.

When the positive clutch member 68 is moved rearward to engage with the internal splines 60, the transmission mechanism is in second gear, and when it is moved forward to mesh with the internal splines 32, the transmission mechanism is in direct, or high gear.

The invention is not shown in connection with the low and reverse gears, as it is not believed their speeds require that they be synchronized before engagement, but with the tooth speeds attained by the second and direct gears, it is believed a synchronizing device is highly desirable, especially when it will enable an operator to shift from high to second, or back, while running at any speed. It will, therefore, be understood that the invention, though only shown and described as applied to second and direct gears, is equally applicable to low and reverse, or, in fact, any gear ratios that may be desired.

In the operation of the present transmission a shift of the gear 90 to low, or reverse, may be made in the usual manner, while high and second gear connections are operated as follows:

When desired, the gear-shift lever 16 is operated to move the shifter fork 20 rearward to engage the keys of the clutch member 68 with the internal splines of the gear 58. It will be noted by reference to Figure 1 that the friction strip 63 is spaced from the adjacent face of the clutch plate 83 a distance somewhat less than the distance between the end of the keys 74 and the front end of the splines 60, and as the clutch member 68 moves rearward, the friction strip 63 resiliently engages the face of the plate 83, due to the effort of the spring ring 88 to remain in the groove 80, and causes the two elements to approach the same speed and thereby synchronize the shaft 36 with the gear 58 and permit the clutch keys 74 to engage with the internal splines of the gear 58.

Figure 2:
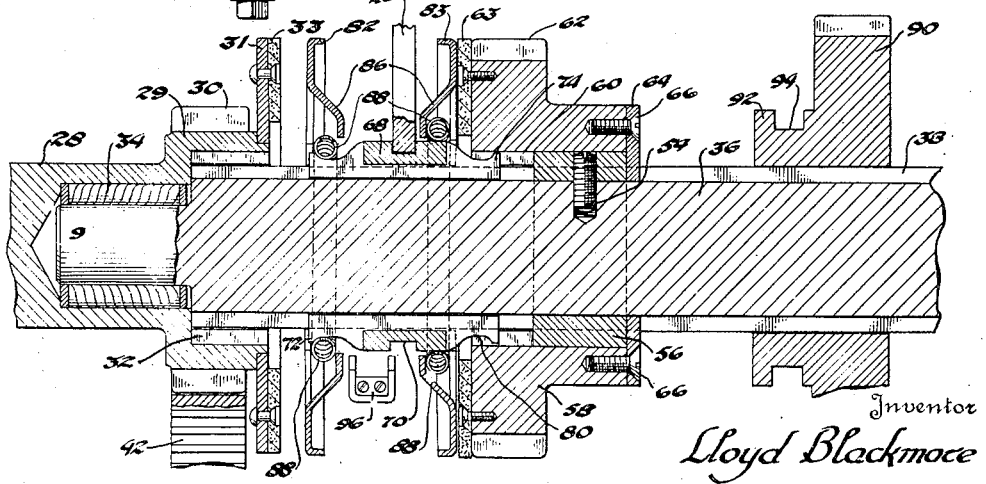
Figure 2 is an enlarged lonigtudinal sectional view through a portion of the main shaft and gears thereon.

As the clutch member 68 moves farther rearward after the friction elements 63 and 83 have engaged, the plate 83 forces the spring ring out of its groove 80 forward on the larger surface of the central portion of the clutch member 68, as illustrated in Figure 2, and where the spring ring exerts very little effort to force the clutch member and gear apart, so that the regular detent mechanism, as used in connection with the gear-shift, is strong enough to retain the clutch in engagement. When the gear-shift lever 16 is operated to move the clutch member 68 back to neutral position, the spring ring 88 slides down the surface of the central portion of the clutch member 68 until it again rests in its groove 80, where it remains holding the clutch plate 83 against axial movement. The engagement of the clutch member 68 with the internal teeth 32 of the forward pinion 29 is accomplished in a similar manner.

If it is found necessary, a stop such as a bracket piece 96 may be secured to the casing 10 and projected between the friction plates, where it will stop one of the friction plates while the clutch member is being moved from a gear to neutral, and force the plate along the groove until the spring ring is seated in its groove.

It will be understood that the embodiment of the invention as shown may be modified without departing from the spirit of the invention as recited in the appended claims.

I claim:

1. A gear shift clutch member for mounting on a shaft for selective engagement with one of two gears, comprising a collar decreasing in circumference from the center axially in either direction, and an annular groove about the collar on each side of the main portion, said collar being extended outward beyond the grooves to form keys for engaging either of said gears.

2. A gear shift clutch member for mounting on a shaft for selective engagement with one of two gears, comprising a collar provided with a circumferential groove for receiving a shifter fork, said collar decreasing in circumference in either direction away from the groove, an annular groove about the collar toward each end, the collar being extended outward beyond the outer grooves for providing keys for engaging either of said gears.

3. A gear shift clutch member having an axial opening for mounting on a shaft for selective engagement with one of two gears, comprising a main annular portion with axial extensions on each side thereof, an annular groove being formed in each extension, said clutch member increasing in circumference toward its center and provided in its central portion with an annular groove for receiving a shifter fork, and splines in the axial opening in the clutch member.

4. In combination, a shaft, a clutch member slidable but non-rotatable thereon, a coaxial member mounted for rotation relative to said shaft, said coaxial member and clutch member having parts to be engaged to positively prevent relative rotation therebetween, said coaxial member having a friction face axially beyond its clutch element and adjacent the clutch member, a friction disc non-rotatable but axially slidable on said clutch member, said clutch member having a circumferential groove adjacent the coaxial member, a spring member in said groove, said friction disc having inwardly directed radial fingers, said spring being positioned between the plane of said friction disc and said fingers, and means to slide said clutch member to effect frictional engagement of said friction disc and friction face, and thereafter a positive engagement of said coaxial member and clutch member.

5. The invention set forth in claim 4 together with a member fixed in position to engage said friction disc and move it axially relative to the clutch member when said clutch member is being moved in one direction.

In testimony whereof I affix my signature.
LLOYD BLACKMORE.